Figure 1:
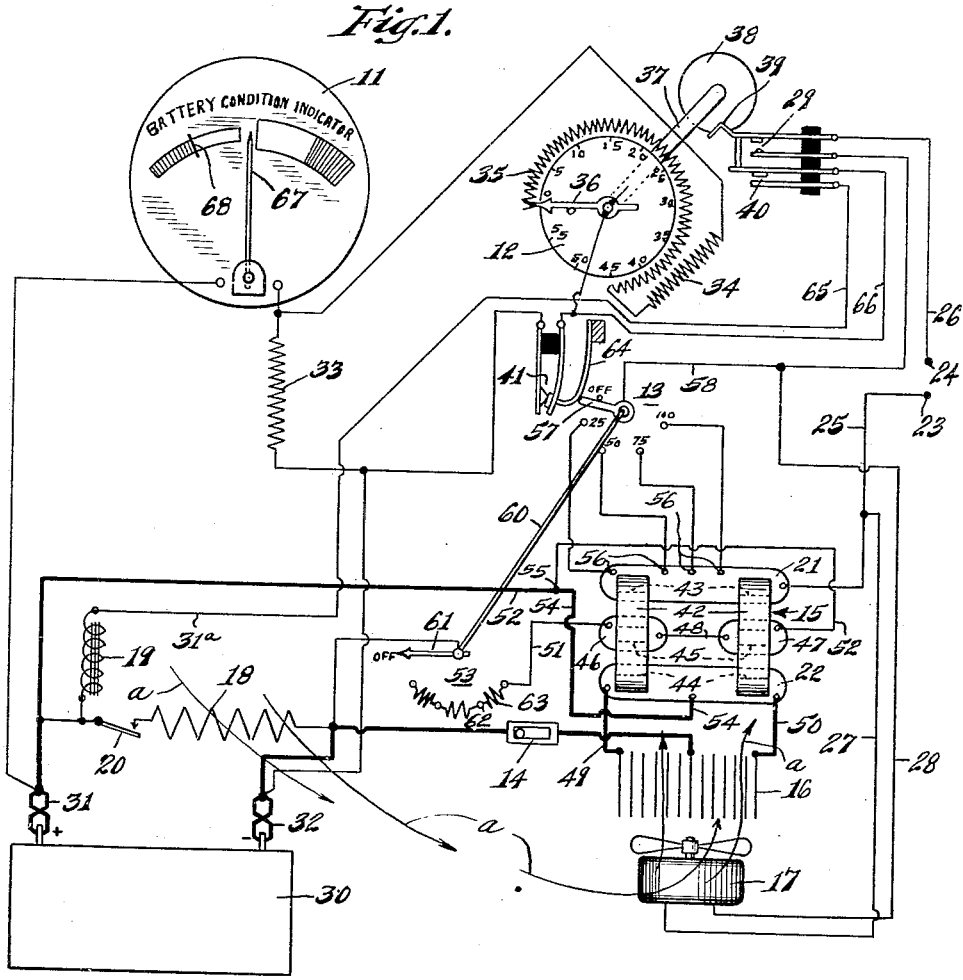

Feb. 17, 1948.     M. L. PUGH     2,436,057
BATTERY CHARGING APPARATUS
Filed Sept. 5, 1945

INVENTOR.
Merlin L. Pugh.
BY Bair & Freeman
Attys.

Patented Feb. 17, 1948

2,436,057

UNITED STATES PATENT OFFICE 2,436,057

BATTERY CHARGING APPARATUS

Merlin L. Pugh, Minneapolis, Minn.

Application September 5, 1945, Serial No. 614,465

7 Claims. (Cl. 320—20)

The present invention relates to an apparatus for charging storage batteries at a high rate and in accordance with the condition of the battery.

In my co-pending application, Serial No. 603,454, filed July 6, 1945, for "Battery charging apparatus," which has since matured as Patent No. 2,431,707, patented December 2, 1947, there is provided an apparatus which may be electrically connected to a storage battery while it is in an automobile or the like, and the apparatus adjusted for determining the condition of the battery while simultaneously adjusting a time switch which will effect charging of the battery for a time period compatible with the tested reading for the battery when a charging control switch is subsequently adjusted for charging the battery at a predetermined high rate. In the aforesaid co-pending application, the charging control switch is adjusted by observing the recommended or desired current conditions at which the particular battery should be charged, and the charging control switch is moved until the correct amperage is supplied as shown on an ammeter connected in the charging circuit. If variations occur in charging current, it is necessary to re-adjust the charging control switch until the desired amperage is again supplied, as indicated by reading the ammeter. This, obviously, requires additional time and effort on the part of the user and involves the reading, interpretation and adjustment of the ammeter readings.

One object of the present invention is to provide complete automatic control of the charging rate after the user has set the charging control switch to the desired value.

Another object of the invention is to eleminate one meter from the prior charging apparatus, that is, the ammeter, together with the necessity of the user observing the readings thereon and making further adjustments of the charging rate.

A further object of the invention is to provide an automatic charging rate transformer in the charging circuit of a high speed battery charger in which the user may quickly test the battery, determine the time and charging current required, and then manually set the time and charging current to the determined values, after which these factors are automatically controlled.

Still another object of the invention is to provide a battery charging apparatus wherein complicated testing technique is eliminated and in place of it a time switch is adjusted until a battery condition indicator indicates a predetermined point, and, thereafter, the charge control switch may be adjusted for the recommended charging rate, after which the charging rate is automatically maintained, the entire testing and setting of the apparatus for charging a battery being thereby reduced to the two operations of adjusting the time switch and the charge control switch.

Figure 2:
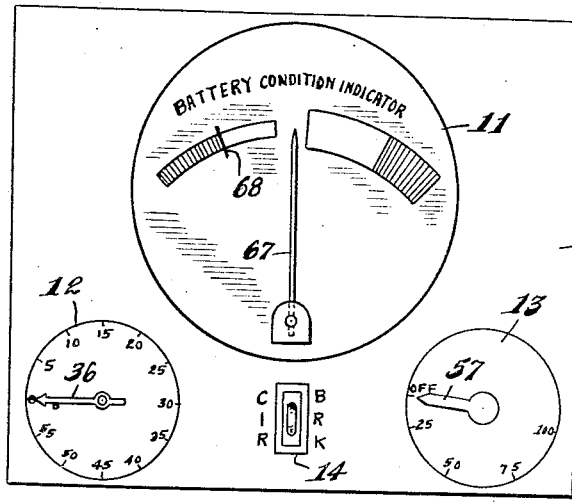

With these and other objects in view, my invention consists in the construction, arrangement and combination of the various parts of the device whereby the objects contemplated are attained, as hereinafter more fully set forth, pointed out in the claims, and illustrated in the accompanying drawing, in which:

Fig. 1 is an electro-diagrammatic view of the improved battery charging apparatus; and Fig. 2 is a plan view of the control panel for the charging apparatus.

Referring to the drawing, numeral 10 indicates a panel on which is mounted a battery condition indicator, such as a voltmeter 11. A time switch 12 of a known type, having clock-actuated spring return mechanism, a charge control switch 13 and a circuit breaker 14, are also mounted on the panel 10. These devices may be mounted on top of a suitable housing (not shown) in which an automatic charging rate transformer 15, hereinafter described in detail, a rectifier 16, a fan 17, a load coil 18 and a relay comprising a relay coil 19 and a load switch 20 are mounted. These latter elements are shown in Fig. 1.

As also shown in Fig. 1, the transformer 15 has a primary coil 21 and a secondary coil 22. The primary coil 21 is adapted to be energized from a source of 110-volt A. C. current, for example, supplied to terminals 23 and 24 and through power leads 25 and 26, respectively. The fan 17 is also energized from the terminals 23 and 24 through conductors 27 and 28, the transformer 15 and fan 17 being under control of a master switch 29. The fan 17 is so located as to dissipate heat from the rectifier 16 and the load coil 18 as indicated by arrows $a$, which load coil may carry a current of from 150 to 175 amperes from a storage battery 30 which is being tested and charged.

The battery 30 is, for example, the storage battery of an automobile, and it is connected to the secondary circuit by a pair of heavy spring clips 31 and 32. The circuit breaker 14 automatically trips out if the clips 31 and 32 are connected in wrong polarity relationship to the terminals of the battery 30, or if a heavy overload occurs while charging.

The voltmeter 11 is connected across the clips 31 and 32 with a resistor 33 in series with the voltmeter to depress the zero reading thereof. Shunting the resistor 33 are resistors 34 and 35 in series with each other. The resistor 35 is part of a rheostat, the movable blade of which is indicated at 36. The blade is mounted on a shaft 37, which shaft extends through and is connected with the timing mechanism of the time switch 12 for setting it. The shaft 37 has a cam 38 connected thereto, provided with a notch 39 for permitting a relay switch 40 and the master switch 29 to remain in the open position shown in Fig. 1, and to return to open position after the time switch 12 has been set and returns to the "0" or "Off" position. The time switch 11 may be provided with minutes of time indicia, if desired, although this is unnecessary except as a means to indicate how long the time switch will run after being set. When the time switch is in the "0" position, the rheostat 34—36 is at that time in its maximum resistance position.

A second relay switch 41 is in series with the relay switch 40 and these two switches are in series with the relay coil 19, the three being connected across the clips 31 and 32. When the relay coil 19 is energized, it closes the load switch 20.

The apparatus just described is described and claimed in the aforesaid pending application, Serial No. 603,454, and in accordance with the present invention, the automatic charging rate transformer 15 is combined with the battery charger to automatically control the rate of charging a battery after the user sets the rate of charge, and to eliminate the need for an ammeter in the battery charger.

The transformer 15 includes a core having end legs 42 connected by primary, secondary, and direct current legs 43, 44 and 45, respectively. This transformer is described and claimed in my Patent No. 2,235,330, issued March 18, 1941, for Battery charger.

The legs 43 and 44 may be arranged double or in a plurality of other arrangements, but as to the legs 45, two of necessity are provided. On the legs 45, direct current coils 46 and 47 are provided and the coils are connected in series by a conductor 48. On the primary legs 43 of the transformer the primary coil 21 is wound. On the secondary legs 44, the secondary coil 22 is wound. Alternating current is supplied to the primary coil 21 from the terminals 23—24, as explained hereinbefore. Output from the secondary coil 21 is conveyed to the rectifier 16 through conductors 49 and 50, whereby rectified current is supplied to the battery for charging it. With the exception of the direct current coils 46 and 47, a standard transformer has thus far been described, without regulation. The direct current coils 46 and 47 provide automatic regulation. For this purpose, a pair of conductors 51 and 52 connect the coils 46 and 47 across the battery, the conductor 51 connecting the coil 46 to the battery through a variable resistance 53 for a purpose hereinafter described. A conductor 54 connects a center tap on the secondary coil 22 to the battery clip 31, and conductor 52 is connected to conductor 54 at 55.

The charge control switch 13 is provided with several positions marked for convenience "Off," 25, 50, 75 and 100 amperes. A terminal is provided at each of these points which terminals are connected to suitable taps 56 on the primary coil 21 of the transformer. A movable contact arm 57 has one side thereof connected to one side of the main switch 29 by conductor 58 and makes contact with the desired terminal as it is rotated. An insulated shaft 60 connects the contact arm 57 with a second contact arm 61 associated with the resistance 53 and the two arms, therefore, move together. One side of the arm 61 is connected to the battery terminal 32 through conductor 51 and the other side of the arm contacts terminals 62 corresponding to the terminals on the charge control switch 13 with resistances 63 in series between the terminals 62 and connected to direct current coil 46 through the other end of conductor 51.

When the arm 57 of the charge control switch is in the "Off" position, it engages a leaf spring 64 for closing the relay switch 14. It also moves arm 61 of the variable resistance 53 to the "Off" position, thus breaking the circuit from the D. C. coils 46 and 47 to the battery 30.

Operation

In the operation of the battery charging apparatus, when the parts are in the position shown in Fig. 1, that is, with the time switch 12 set at "0" or "Off" and the charge control switch at the "Off" position, the clips 31 and 32 may be connected to the terminals of a storage battery 30 and the voltmeter will give a reading which has no particular significance. In order to test the battery, it is necessary to test its voltage with a load applied thereto.

The operator then rotates the time switch 12 from the "0" position which causes the cam 38 to close the switches 29 and 40 and reduce the resistance in the resistor 35. Closure of the master switch 29 causes the fan 17 to operate (for subsequently dissipating heat from the rectifier 16 and load coil 18) and supplies current to the charging switch blade 57 through conductor 58. Closure of the switch 40 energizes the relay coil 19 through conductors 65 and 66 thereby closing switch 20 to throw the load coil 18 across the terminals of the battery 30. This will cause an indicating needle 67 to drop to a lower reading, because the battery is discharging, and accordingly a true test of the battery can now be made on the voltmeter. If the battery is partially discharged, the needle will fall below check line 68. If the pointer is above the check line 68, it shows the battery is fully charged.

The timer switch 12 is now adjusted further clockwise which causes the resistance 35 to be gradually reduced and this increases the flow of current through the voltmeter 11 so that the needle 67 swings further toward the right. When it reaches the check line 68, this indicates to the operator that the time switch 12 has been properly adjusted.

If it is impossible for the operator to bring the needle up to the check line 68, even after rotating the knob 36 to the extreme clockwise position, it indicates that the battery is in a questionable state and should be given a five-minute trial charge at 80 amperes and re-tested again in the above manner. If, after a trial charge, the operator is still unable to bring the needle 67 up to check line 68, the battery may be considered defective and should be discarded.

The next step in the operation is to adjust the charge control switch 13 by rotating the arm 57 to one of the marked positions. This causes the arm to leave the spring blade 64, thereby opening the relay switch 41 to effect deenergization of the relay coil 19 and opening switch 20 to break the circuit to the load coil 18. It is, of course, desirable to remove the load of the coil from the battery as soon as possible.

The movement of the arm 57 of the charge control switch 13 also moves arm 61 of the variable resistor 53 to one of its positions in which more or less resistance is in the circuit to the D. C. coils 46, 47 of the transformer 15. The primary 21 of the transformer 15 is also in the circuit at a value determined by the arm 57 and terminals of the charge control switch 13. Charging of the battery will continue for the proper time, depending on the setting of the time switch 12, as already described.

Furthermore, the charging rate will be maintained constant because the taps 56 on the primary coil 21 will give an approximately constant charge and the D. C. coils 46 and 47 on the transformer will maintain the set rate constant in the following manner, it being understood that the resistances 63 will permit more or less current to flow to the coils 46 and 47 depending on the setting of arm 61 as determined by the setting of arm 57 and the taps in use on the primary coil 21 of the transformer. Once the value is set for charging however, it will not vary as the battery becomes more fully charged and the resistance to current flow therethrough increases (the charging voltage remaining constant).

The connection of the direct current coils 46 and 47 in series and in opposition causes the resultant of the alternating current voltage built up in each coil to buck each other and the current at leads 51 and 52, is, therefore, zero. Connecting these leads across the battery 30 results in the current from the battery energizing the coils 46 and 47 in proportion to the strength of the battery. The direct current in the coils 46 and 47 causes a direct current magnetic flux in the legs 45 of the transformer. This reduces the number of alternating current flux lines in the legs 45 and forces them into the legs 44, thereby increasing or decreasing the secondary current from the secondary coil depending on the amount of current flowing in the coils 46 and 47. As a result, regardless of the condition of the battery 30 at various stages of the charging process, the rate of charging will remain constant. It is obvious that at low charging rates more of the resistances 63 are in the circuit leading to the D. C. coils 46 and 47 and, therefore, the current in the coils will be less and the charging rate lower, but constant, and in accordance with the taps 56 in use on the primary coil 21 of the transformer. As higher charging rates are desired, the resistances 63 are successively removed from the circuit and higher and constant charging rates result because of increased D. C. current in the coils 46 and 47, and because of the increased effective positions of the primary coil 21.

After the charge control switch 13 has been adjusted from the "Off" position, the relay circuit for the coil 19 is now open, thus opening the load circuit, and the voltmeter 11 will now give a different reading because the resistances 34 and 35 are out of the circuit due to the opening of switch 41 and due to the battery now being charged rather than discharged. The needle 67 during charging should fall above the check line 68 and will gradually indicate a higher voltage by swinging toward the dark portion of the scale toward the right, the left end of this portion indicating about 8 volts. If the voltage then rapidly rises in this portion of the charging zone, it indicates full charge.

From the foregoing description, it will be obvious that I have provided a battery charging apparatus wherein the matter of setting the charger for proper time of charging is reduced to a single operation and wherein the rate of charge when set remains constant without adjustment or the necessity for the operator to watch an ammeter. Thus, for a battery that may be charged at a high rate, there are only three operations necessary, namely: (1) placing the clips 31 and 32 on the battery, (2) rotating the arm 36 of the time control switch 12 until needle 67 of voltmeter 11 reaches the line 68; and (3) adjusting the charge control switch 13.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In battery charging apparatus, a charging circuit including a time switch for determining the time a battery is to be charged, a transformer including a primary coil, a secondary coil, a plurality of taps on the primary coil for varying the output of the secondary coil and a pair of opposed and serially connected direct current coils connected across the battery, a variable resistor connected between the battery and the direct current coils and a charging switch for determining the rate of charge during said time and being adjustable to simultaneously change the tap setting of the primary coil and the resistance of the variable resistor to set and maintain constant the output of the transformer to the battery.

2. In a battery charging apparatus, a charging circuit including a time switch for determining the time a battery is to be charged, a transformer including a primary coil, a secondary coil, a plurality of taps on the primary coil for varying the output of the secondary coil and a pair of opposed and serially connected direct current coils connected across the battery, a variable resistor connected between the battery and direct current coils, and a charging switch for setting the rate of charge during said time and adjustable to vary the resistance of the variable resistor to maintain constant the output of the battery transformer.

3. In battery charging apparatus, a charging circuit including a time switch, a meter connected with the battery for indicating the voltage thereof, a variable rheostat in circuit with said meter and mechanically connected with said time switch for simultaneous operation therewith to indicate the proper time period for charging the battery in accordance with a predetermined reading on the meter, and a transformer in the charging circuit including means for maintaining said charging rate constant during said time.

4. In battery charging apparatus, a charging circuit including a time switch, a meter connected with the battery for indicating the voltage thereof, a variable rheostat in circuit with said meter and mechanically connected with said time switch for simultaneous operation therewith to indicate the proper time period for charging the battery in accordance with a predetermined reading on the meter, a transformer in the charging circuit including means for maintaining said charging rate constant during said time, and an adjustable switch for manually varying the output of said transformer.

5. In battery charging apparatus, a charging circuit including a time switch for controlling said circuit, a transformer including means for maintaining the charging rate constant, a charge control switch for adjusting the output of said transformer to obtain a desired constant output value, a rheostat variable in accordance with the setting of said time switch, a meter for the battery in circuit with said rheostat, switching means for controlling the charging of the battery and the circuit through said rheostat operated by said charging control switch, and a load for the battery adapted to be placed in circuit with said meter only at a time when the battery is not being charged, said switching means effecting removal of the load from the battery when it is adjusted for charging the battery.

6. A battery charging apparatus comprising a charging circuit, a normally open master switch for controlling said circuit, a time switch movable to a plurality of positions including an "Off" position, said time switch in said "Off" position opening said master switch, and in all other positions closing said master switch, a load for said battery, a voltmeter for testing the battery while said load is applied thereto, a rheostat for modifying the indication on said voltmeter in accordance with the position of said time switch, a transformer including means for automatically maintaining a constant charging rate, and a charge control switch for disconnecting said load from the battery when it is moved to the charging position and for selecting a desired constant charging rate from said transformer.

7. Battery testing and charging apparatus for high rate battery charging comprising a meter circuit adapted to be connected to terminals provided on the battery, a battery load circuit adapted to be connected to said battery terminals, a fixed load for said battery circuit, means for connecting said load into said battery load circuit during testing, a charging circuit, a time switch in the charging circuit containing time indicia thereon, a voltmeter connected in said meter circuit, said voltmeter including indicia for visually determining in time units, in conjunction with said time indicia on said time switch, the amount of time required to substantially fully charge the battery, without the necessity of any calculations, a charging switch for determining the rate of charge, and a charging transformer in said charging circuit, said charging transformer including means for maintaining said charging rate constant.

MERLIN L. PUGH.

REFERENCES CITED

The following references are of record in the file of this patent:

UNITED STATES PATENTS

| Number | Name | Date |
|---|---|---|
| 2,235,330 | Pugh | Mar. 18, 1941 |
| 2,285,620 | Sears | June 9, 1942 |
| 2,347,452 | Amsden | Apr. 25, 1944 |
| 2,354,877 | Peters | Aug. 1, 1944 |
| 2,366,505 | Fletcher | Jan. 2, 1945 |